United States Patent [19]
Sorrells

[11] Patent Number: 5,920,288
[45] Date of Patent: *Jul. 6, 1999

[54] TRACKING SYSTEM AND METHOD FOR CONTROLLING THE FIELD OF VIEW OF A CAMERA

[75] Inventor: David F. Sorrells, Jacksonville, Fla.

[73] Assignee: ParkerVision, Inc., Jacksonville, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 08/473,731

[22] Filed: Jun. 7, 1995

[51] Int. Cl.$^6$ ....................................................... G01S 3/02
[52] U.S. Cl. ............................................ 342/465; 367/127
[58] Field of Search ........................... 342/465; 367/127; 356/139.04, 139.06

[56] References Cited

U.S. PATENT DOCUMENTS

| | | | |
|---|---|---|---|
| 4,357,672 | 11/1982 | Howells et al. | 364/561 |
| 4,980,871 | 12/1990 | Sieber et al. | 367/127 |
| 5,652,593 | 7/1997 | Rench et al. | 342/458 |

*Primary Examiner*—Theodore M. Blum
*Attorney, Agent, or Firm*—Arthur G. Yeager

[57] ABSTRACT

The system includes circuitry for measuring the distance between a transmitter and one or more receivers, and having a timing circuitry to measure the time-of-flight of an RF pulse and the transversed distance of the pulse. The use of two receivers in a single plane provides for the determination of the location of the transmitter with respect to a reference position created by the associated tracking system and the automatic tracking of the transmitter with the field of view of a camera by the tracking system.

19 Claims, 6 Drawing Sheets

FIG.I

TRACKING SYSTEM AND METHOD FOR CONTROLLING THE FIELD OF VIEW OF A CAMERA

BACKGROUND OF THE INVENTION

1. Field of the Invention

The present system relates to automatic tracking systems employing control of the field of view of a camera.

2. Prior Art

There are a wide variety of distance-measuring and position-sensing technologies such as that described in the "time-of-flight radio location system", filed by Thomas E. McEwan U.S. Pat. No. 5,510,800. This invention discloses automatic tracking systems and camera field of view control systems operated by a microcontrolled-based automatic control system. These prior art tracking systems employ mechanical means for scanning an area for a control unit. What is desired is a non-mechanical location determination and tracking methodology having very high resolution and fast response times. The present invention provides for improvements over the prior art systems.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE PREFERRED EMBODIMENT

The present invention includes a system for the determination of the location of a remote object and the automatic tracking of the object. The basic electronics and command capability of the present system is described in detail in U.S. Pat. No. 5,268,734 and applications Ser. Nos. 08/197,669; 08/196,774; 08/078,434; and 08/255,257. The present invention includes all the programming needed for automatic tracking and the complete control of the field of view of a camera as discussed in the cited patent and applications.

The present invention employs improvements in the prior distance-measuring system and method described in the application "time-of-flight radio location system" filed by Thomas E. McEwan U.S. Pat. No. 5,510,800.

Figure 1:
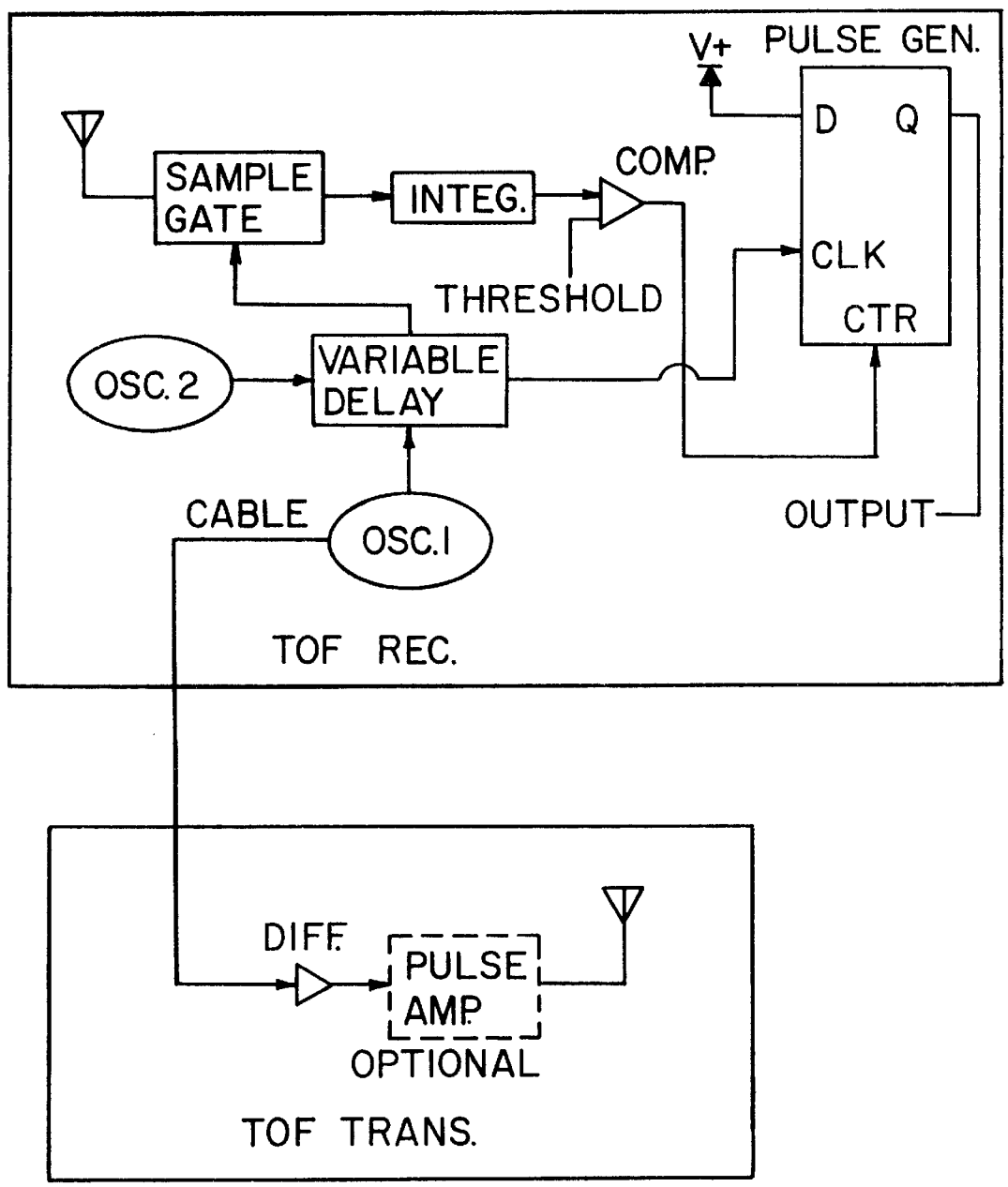
FIG. 1 is a simplified block diagram of the time-of-flight measuring system used in the field of view control of a camera in accord with the present invention.

The basic time-of-flight (TOE) system which has been modified from the prior art consists of a TOE transmitter and at least one TOE receiver connected by a cable of a known length (FIG. 1).

The transmitter includes the following components:

1. Oscillator 1 generates the time base for the system. In this configuration, it is a shared resource between the transmitter and receiver. The frequency of oscillator 1 determines the maximum range that can be measured between the transmitter and receiver.
2. A differentiator converts oscillator 1's output to high frequency pulses. The time constant of the differentiator determines the fundamental RF frequency of the system.
3. A pulse amplifier amplifies the output of the differentiator and provides any necessary impedance matching to the antenna. In a very low power close range situation, the pulse amplifier may be eliminated.

The receiver includes the following components:

1. Oscillator 1 generates the sampling pulse for the sample gate and sets the sampling frequency of the system.
2. A variable delay generates the sample clock for the sample gate. The variable delay determines when the RF sample occurs relative to the system sampling pulse. The delay is controlled by oscillator 2.

SUMMARY OF THE INVENTION

In one aspect of the present invention there is provided a method of calculating the angle of displacement of an object from a reference angle having an origin at a reference position including transmitting a signal from the object to the reference position after receiving an initial transmitted sync signal as a timing reference; receiving the signal transmitted at the reference position at two locations spaced a known distance apart; determining the distance between each respective spaced location and the object; and computing the angle of displacement of the object from the reference from the distance determinations. Preferably the signal is electromagnetic and the method includes locating the object and the two spaced locations in the same plane.

Other aspects of the present invention include a method of tracking a movable object with a camera field of view by determining the position of the object with respect to a reference position according to the procedure of: transmitting a signal from the object to the reference position; receiving the signal transmitted at the reference position at two locations spaced a known distance apart; determining the time-of-flight of the signal from the object to each spaced location; determining the distance between each respective spaced location and the object; computing the angle of displacement of the object from the reference from the determinations of step D; and tracking the object with the field of view of a camera in response to the computation of step E.

The invention also relates to a system for calculating the angle of displacement of an object from a reference angle having an origin at a reference position that includes electromagnetic signal transmission means located at the object for transmitting a signal to the reference position, receiving means at the reference position at two locations spaced a known distance apart for receiving the signal transmitted, synchronizing means coupled to the transmission means for initiation of the signal transmitted and coupled with the receiving means at each of the two locations for coordinating the signal transmitted with that received by the receiving means, first circuit means for determining the distance between each respective spaced location and the object, and second circuit means for computing the angle of displacement of the object from the reference and providing an output signal indicative of the angle of displacement.

Another aspect of the invention is presented in which a system tracks a movable object with a camera field of view by determining the position of the object with respect to a reference position including electromagnetic signal transmission means at the object for transmitting a signal to the reference position and receiver means located at the reference position at two locations spaced a known distance apart for receiving the transmitted signal. There is a first circuit means for determining the time-of-flight of the signal from the object to each spaced location, a second circuit means for determining the distance between each respective spaced location and the object in response to the determined time-of-flight, and a third circuit means for computing the angle of displacement of the object from the reference from the determinations of the second circuit means and for providing a control signal indicative of the computed angle of displacement. Automatic tracking means is also included for automatically tracking an object with the field of view of a camera in response to the control signal from the third circuit means.

An additional aspect of the invention provides synchronizing means for providing a first sync signal to the transmitter means to initiate transmission of the signal and a second sync signal to each receiver means to coordinate the transmission and receiving of the transmitted signal. Each receiver includes circuit means responsive to the sync signals for determining the difference in time between the transmission of the transmitted signal and the receiving of the transmitted signal by respective receiver means and providing a time-of-flight output signal indicative of the determined difference.

A further aspect includes the provision of a third receiver means so that the object, third receiver means and one of the receiver means at one of the two locations are in another plane so that the object may be tracked in two planes.

3. Oscillator 2 controls the variable delay. The frequency of oscillator 2 determines how fast the range of the receiver is scanned.
4. A sample gate samples the RF input. The time of the sample is determined by the sample clock.
5. An integrator accumulates the received RF pulses and generates a signal representative of the sum of the RF energy received over the integrator's time constant.
6. A comparator detects when the signal from the integrator is over a predetermined threshold. The output of the comparator is used to indicate the signal from the transmitter has been received.
7. The pulse generator outputs a pulse beginning with the pulse generated by oscillator 1 and ending with the output of the comparator. This pulse width is representative of the distance between the transmitter and receiver.

System Operation

The distance between the receiver and transmitter can be calculated by measuring the pulse width in time of the output of the pulse generator and inputting that value into the following equation:

$$\frac{\frac{1}{\text{oscillator 1}} \cdot \text{speed of light}}{\frac{1}{\text{oscillator 2}}} \cdot \text{time} = \text{distance}$$

Figure 2:
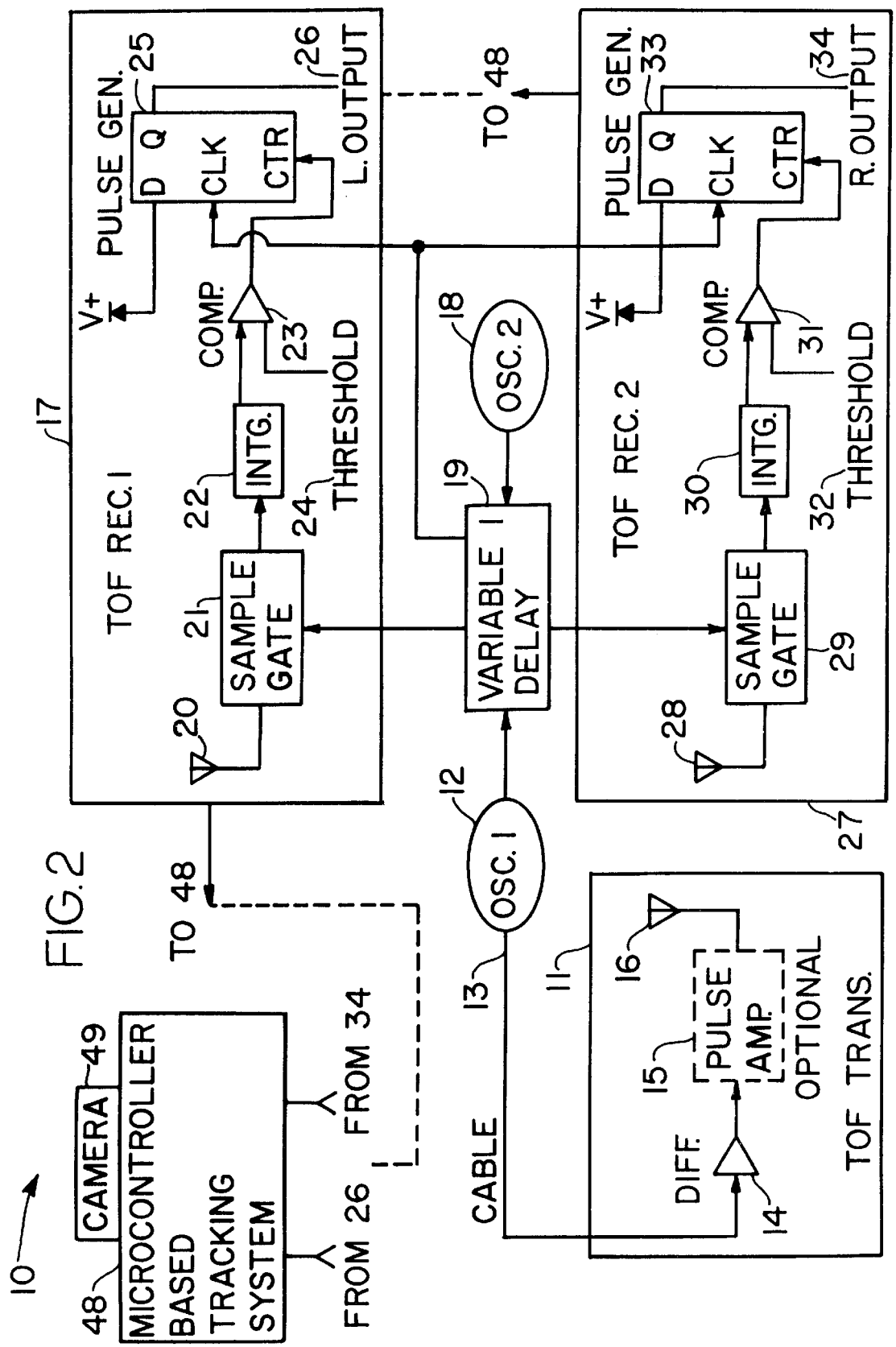
FIG. 2 is a two-receiver block diagram of the measuring system of FIG. 1.

With respect to FIG. 2, a two-receiver embodiment of the present invention is illustrated in block diagram form at 10. The TOF transmitter 11 receives a 2 Mhz signal from oscillator 12 over a cable 13 of known length. The differentiator 14 receives the 2 Mhz pulse sequence and provides a 2 Ghz pulse output at a 2 Mhz rate. An optional pulse amplifier 15 may be included if high power is desired. The 2 Ghz signal is transmitted over the antenna 16.

Two identical receivers 17 and 27 receive the transmitted signals over the respective antennas 20, 28. For simplicity in the disclosure, only one receiver 17 will be described. Sample gate 21 includes a sample-and-hold circuit that is strobed at a rate established by oscillator 12.

Oscillator 18 supplies a signal at a rate substantially less than that of 2 Mhz oscillator 12. The output from oscillator 18 is sent to a variable delay circuit 19 which includes a voltage-controlled delay circuit. The voltage-controlled delay circuit preferably provides a time delay for the sample. Strobe signal from oscillator 12 that is a linear ramp which continues for one cycle of oscillator 18. Accordingly, the strobe signal to gate 21 is delayed through a series of delays measured from a system time that begins after the propagation delay of the oscillator 12 signal to transmitter 11. The series of delays each represent a longer time-of-flight for the transmitted signal. The maximum delay matches the range of the system. When the strobe signal and the received signal occur at the same point in time, the passed pulses into the integrator 22 will have been summed to a value over the threshold voltage 24 set for comparator 23. The resulting signal from comparator 23 will stop the pulse generated by pulse generator 25. At the beginning of system time, the pulse generator 25 was turned on and began providing an output 26. Time-wise, the length of pulse output 26 represents the time-of-flight of the transmitted signal and therefore the distance between the transmitter 11 and receiver 17.

The right output 34 and left output 26 are coupled to a microcontroller based tracking system 48 for controlling the field of view of a camera 49 in accord with the above applications. Herein is disclosed the use of the two receivers to control the field of view in a single plane.

In summary, there are two delays in the system. First, the propagation delay of the signal from oscillator 12 to the transmitter 11 and second, the time-of-flight of the transmitted signal from the transmitter 11 and receivers 17 and 27.

Figure 3:
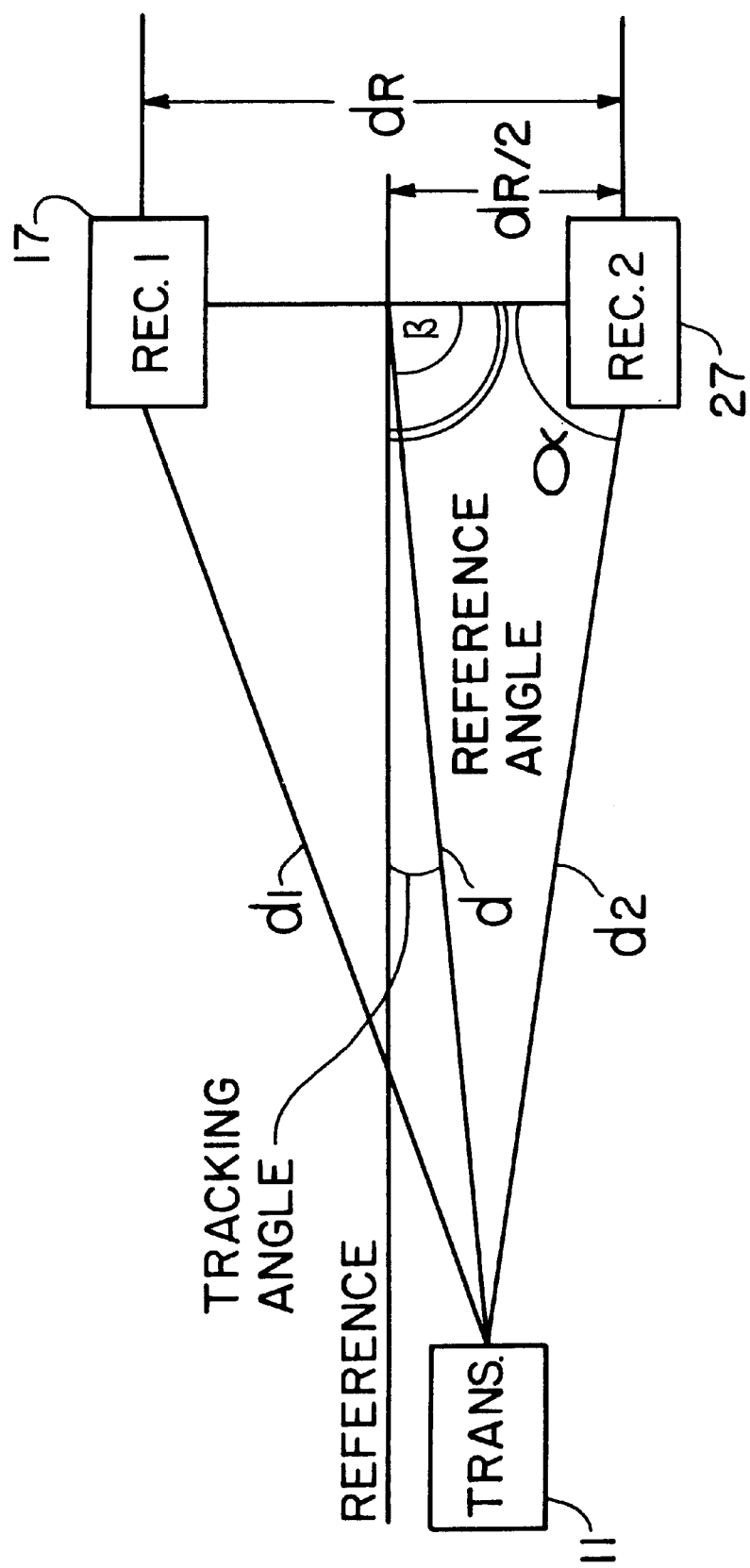
FIG. 3 is a diagram of the distances and angles computed by the system of FIG. 2.

With reference now to FIG. 3, the use of two receivers 17 and 27 provide a means for determining not only the distance between a transmitter 11 and each receiver 17 and 27, but, with the receivers 17 and 27 in the same plane, the angle of the transmitter 11 with respect to a reference line can be determined as shown in FIG. 3. The distance (see Appendix A) is determined according to the following by the firmware in the microcontroller 48 as follows:

$$\frac{1}{2} \cdot \sqrt{2 \cdot d2^2 - dR^2 + 2 \cdot dl^2} = d$$

The tracking angle is the reference angle (in this case, $\pi$) minus the angle $\beta$. The equation for $\beta$ is as follows:

$$\pi - a\cos\left[\frac{1}{2} \frac{(2 \cdot d2^2 - 2 \cdot dl^2)}{\left[\left(\frac{1}{2} \cdot d2^2 \cdot \frac{1}{4} \cdot dR^2 + \frac{1}{2} \cdot dl^2\right) \cdot dR^2\right]}\right] = \beta$$

In the present invention, the reference angle is determined by the microcontroller that operates the control and tracking system 48 of a camera 49. The microcontroller also performs the above computations and provides the tracking angle data into the PID algorithmic controls of the system 48.

Figure 4:
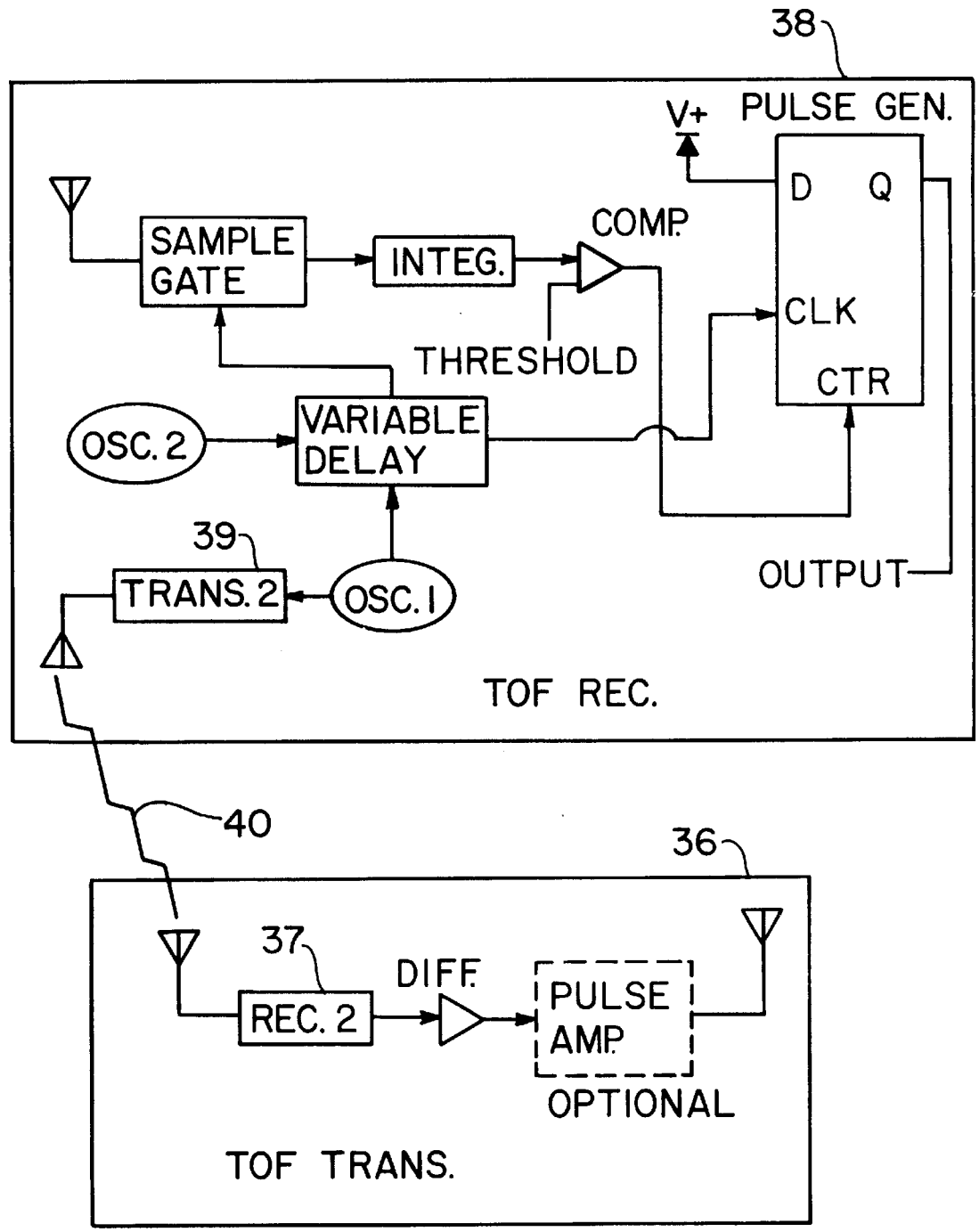
FIG. 4 is a block diagram of a time-of-flight measuring system without a hardwired synchronization circuit.
Figure 6:
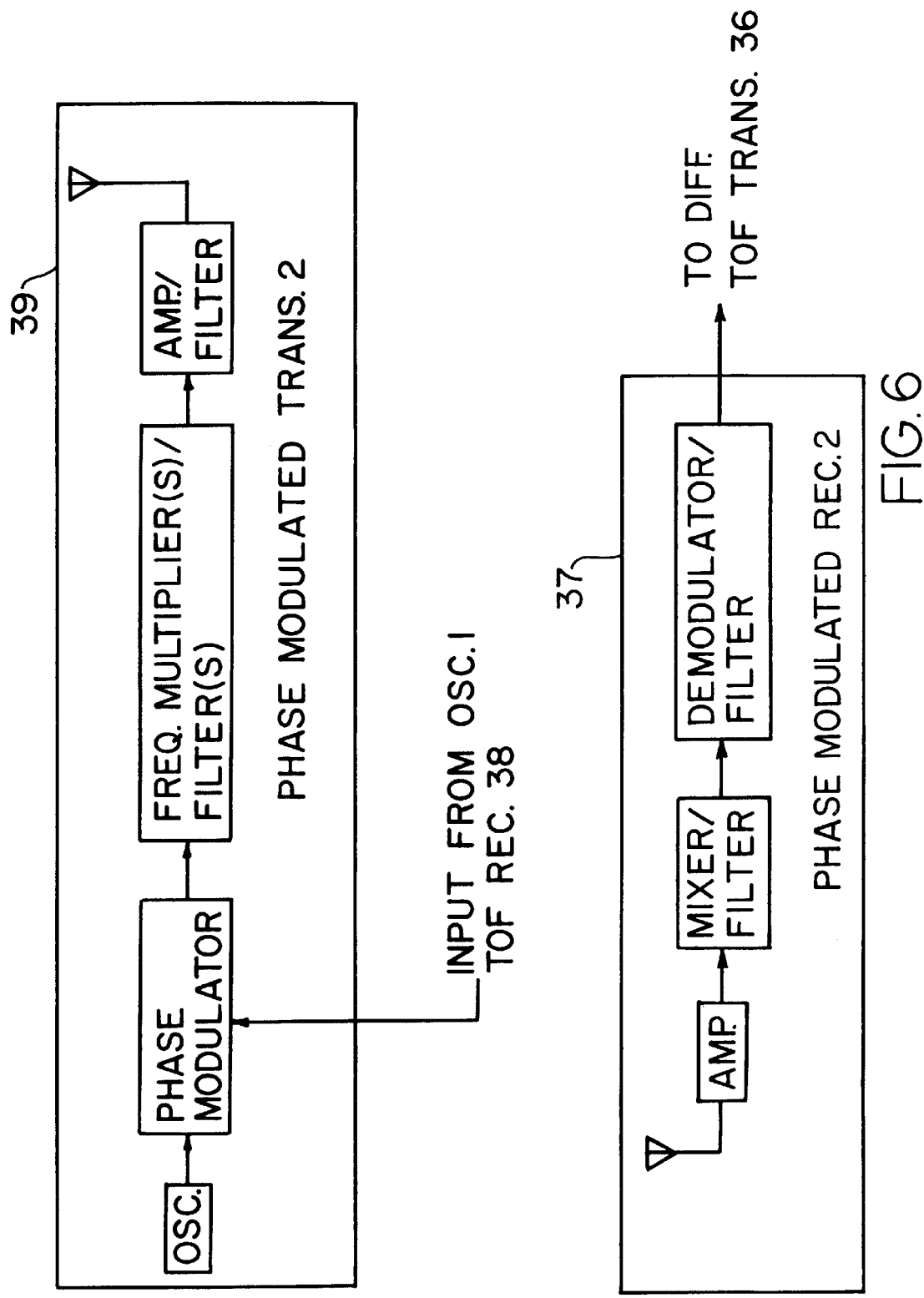
FIG. 6 is a simplified block diagram of the phase modulation circuitry employed in the system of FIGS. 4 and 5.

FIG. 4 illustrates an improved embodiment of the present invention wherein the timing cable 13 is eliminated. This is accomplished by adding a second transmitter 39 to receiver 38 and a second receiver 37 to the transmitter 36, which are both phase-modulated as shown in FIG. 6.

The cable-less system 35 employs a TOF transmitter 36 identical with that of FIGS. 1 and 2 but with the addition of a phase-modulated receiver 37 in the place of timing cable 13 input. The TOF receiver 38 is identical with those of FIGS. 1 and 2, but with a phase modulated transmitter 39 in place of the cable 13 output. RF signal 40 thus takes the place of the timing cable for the synchronization of the TOF transmitter 36 and receiver 38. The preferred embodiment employs a conventional phase-modulation (PM) scheme but a variety of other standard amplitude and frequency modulation methods may be used.

Figure 5:
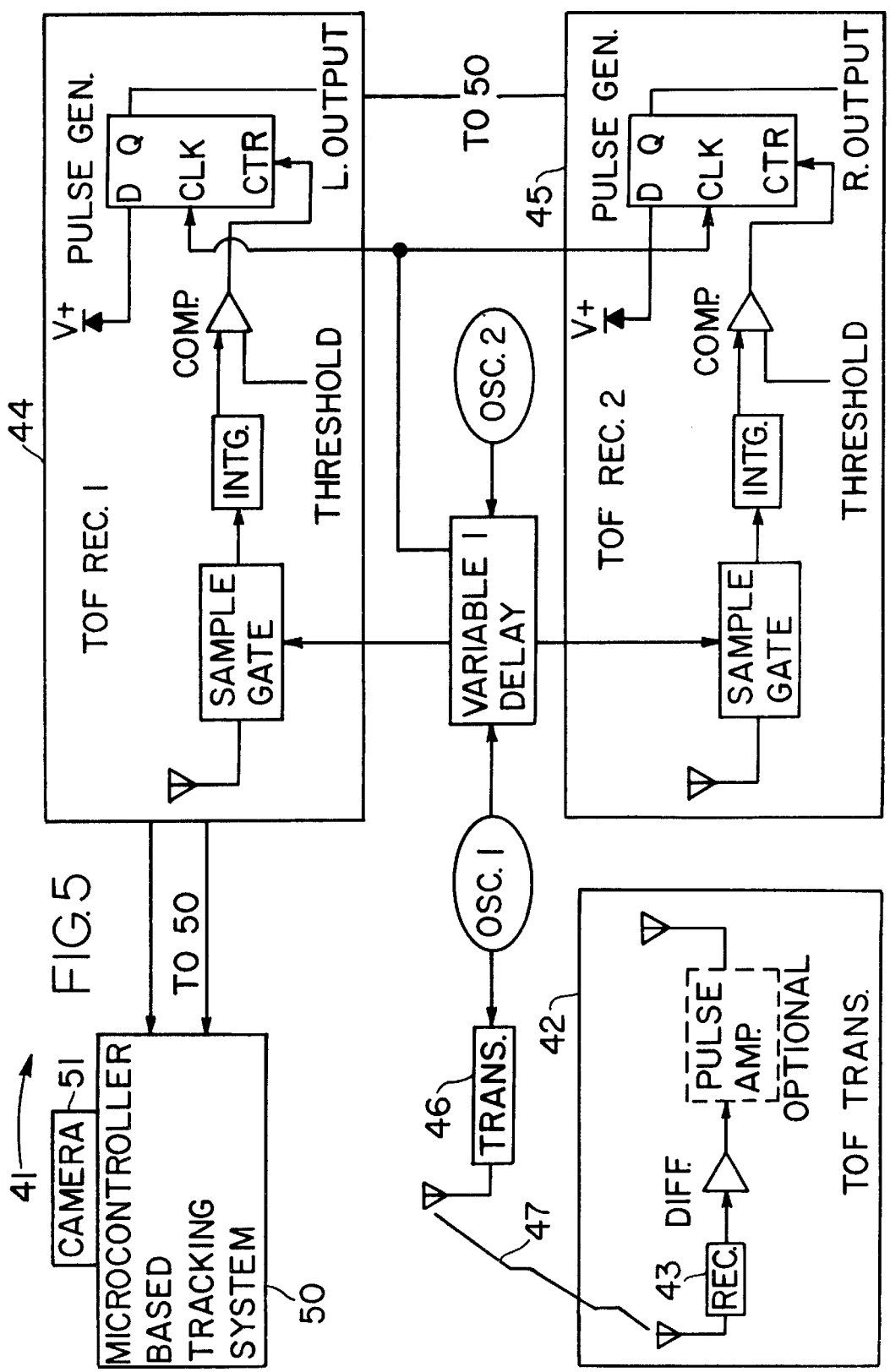
FIG. 5 is a block diagram of a two-receiver tracking system employing the circuitry of FIG. 4.

FIG. 5 illustrates the use of the cable-less or PM system of FIG. 4 in a tracking system. The system 41 includes TOF transmitter 42 having a PM receiver 43 in communication with PM transmitter 46 which synchronizes the system time of the transmitter 42 and left and right receivers 44 and 45. The receivers 44 and 45 and transmitter 42 are located in the same plane and operate identically as the system of FIG. 2 and provides output to the PID controls of the tracking system.

A third TOF receiver would permit tracking in two planes whereby two of the receivers are common in each of the two planes, i.e., one receiver being common in both planes. This third TOF receiver would then permit camera control in accord with the previously identified applications.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

Appendix A

Derivation of transmitter distance and tracking angle

1. $dl^2 = dR^2 + d2^2 - 2 \cdot dR \cdot d2 \cdot \cos(\alpha)$     determine $\alpha$ $\pi - a\cos\left[\frac{1}{2} \cdot \frac{(dl^2 - dR^2 \cdot d2^2)}{(dR \cdot d2)}\right] = \alpha$ 2. $d^2 = d2^2 + \left(\frac{dR}{2}\right)^2 - 2 \cdot \frac{dR}{2} \cdot d2 \cdot \cos(\alpha)$     determine $d$ $d^2 = \frac{1}{2} \cdot d2^2 - \frac{1}{4} \cdot dR^2 + \frac{1}{2} \cdot dl^2$ $\frac{1}{2} \cdot \sqrt{2 \cdot d2^2 - dR^2 + 2 \cdot dl^2} = d$ 3. $d2^2 = d^2 + \left(\frac{dR}{2}\right)^2 - 2 \cdot d^2 \cdot \left(\frac{dR}{2}\right)^2 \cdot \cos(\beta)$     determine $\beta$ $\pi - a\cos\left[\frac{1}{2} \cdot \frac{(4 \cdot d2^2 - 4 \cdot d^2 - dR^2)}{(d^2 \cdot dR^2)}\right] = \beta$ $\pi - a\cos\left[\frac{1}{2} \cdot \frac{(2 \cdot d2^2 - 2 \cdot dl^2)}{\left[\left(\frac{1}{2} \cdot d2^2 - \frac{1}{4} \cdot dR^2 + \frac{1}{2} \cdot dl^2\right) \cdot dR^2\right]}\right] = \beta$ 4. Ref angle $- \beta =$ tracking angle     determine tracking angle

What is claimed as new and what it is desired to secure by Letters Patent of the United States is:

1. A method of calculating the angle of displacement of an object from a reference angle having an origin at a reference position comprising the steps of:

A. transmitting an electromagnetic signal from the object to the reference position after receiving by the object an initial transmitted sync signal as a timing reference;

B. receiving the electromagnetic signal transmitted at the reference position at two electromagnetic receiver locations spaced a known distance apart;

C. synchronizing the initiation of the electromagnetic signal transmitted in step A with the receiving thereof in step b at each of the two electromagnetic receiver locations;

D. determining the distance between each respective spaced location and the object by determining the time of flight of the electromagnetic signal between the respective spaced location and the object; and E. computing the angle of displacement of the object from the reference from the determinations of step D.

2. The method of claim 1 further including the step of:

E. locating the object and the two spaced locations in the same plane.

3. The method of claim 2 further comprising the steps of:

H. receiving the signal transmitted at the reference position at another electromagnetic receiver location spaced a known distance from at least one of the two spaced locations;

I. locating the object, the other location and the at least one of the two spaced locations in another plane;

J. determining the distance between the other location and the object; and

K. computing the angle of displacement of the object from the reference from the determination in step J.

4. The method of claim 3 further comprising the step of:

L. tracking the object with the field of view of a camera in response to the computations in respective steps F and K in the respective plane and other plane.

5. A method of tracking a movable object with a camera field of view by determining the position of the object with respect to a reference position comprising the steps of:

A. transmitting an electromagnetic signal from the object to the reference position;

B. receiving the signal transmitted at the reference position at two electromagnetic receiver locations spaced a known distance apart;

C. synchronizing the system timing reference to the initiation of the signal transmitted in step A with the receiving thereof in step B at each of the two electromagnetic receiver locations;

D. determining the time of flight of the signal from the object to each spaced location;

E. determining the distance between each respective spaced location and the object;

F. computing the angle of displacement of the object from the reference from the determinations of step E; and G. tracking the object with the field of view of a camera in response to the computation of step F.

6. The method of claim 5 further including the step of:

H. locating the object and the two spaced locations in the same plane.

7. The method of claim 6 further comprising the steps of:

I. receiving the signal transmitted at the reference position at another electromagnetic receiver location spaced a known distance from at least one of the two spaced locations;

J. locating the object, the other location and the at least one of the two spaced locations in another plane;

K. determining the distance between the other location and the object; and

L. computing the angle of displacement of the object from the reference from the determination in step K.

8. The method of claim 7 wherein step G includes tracking the object with the field of view of a camera in response to the computation in step J in the other plane.

9. A method of calculating the angle of displacement of an object from a reference angle having an origin at a reference position comprising the steps of:

A. transmitting a timing reference signal to a transmitter means at the object and to two receiver means for synchronizing transmission and reception of an electromagnetic signal;

B. transmitting an electromagnetic signal from the transmitter means at the object to the reference position;

C. receiving the signal transmitted at the reference position at the two electromagnetic receiver locations spaced a known distance apart;

D. determining the time-of-flight of the electromagnetic signal transmitted in step B from the object to each spaced location;

E. determining the distance between each respective spaced location and the object; and F. computing the angle of displacement of the object from the reference from the determinations of step E.

10. The method of claim 9 further including the step of:

G. locating the object and the two spaced locations in the same plane.

11. A system for calculating the angle of displacement of an object from a reference angle having an origin at a reference position including an electromagnetic signal transmission means located at the object for transmitting an electromagnetic signal to the reference position, electromagnetic signal receiving means at said reference position at two locations spaced a known distance apart for receiving said signal transmitted, synchronizing transmitting means coupled with said transmission means for synchronizing the initiation of said signal transmitted and coupled with said receiving means at each said two locations for synchronizing said signal transmitted with signals received by respective said receiving means, first circuit means for determining the distance between each respective said spaced location and the object by determining the time of flight of said signal transmitted to each said receiving means, and second circuit means for computing the angle of displacement of the object from said reference and providing an output signal indicative of said angle of displacement.

12. The system of claim 5 wherein the object and said receiving means and said two spaced locations are in the same plane.

13. The system of claim 12 further comprising a second receiving means at said reference position for receiving said signal transmitted at another location spaced a known distance from at least one of said two spaced locations, said another location and said one location and the object being in another plane, said first circuit means determining the distance between said another location and the object, said second circuit means computing another angle of displacement of the object from said reference in said other plane and providing another output signal indicative thereof.

14. The system of claim 13 further comprising means for tracking the object with the field of view of a camera in response to said output signal and said other output signal in respective said plane and said other plane.

15. A system tracking a movable object with a camera field of view by determining the position of the object with respect to a reference position includes an electromagnetic signal transmission means at the object for transmitting an electromagnetic signal to the reference position, electromagnetic signal receiver means located at said reference position at two locations spaced a known distance apart for receiving said transmitted signal, transmitting means at the reference position for transmitting a timing signal to the object to initiate said electromagnetic signal to the reference position, first circuit means for determining the time-of-flight of the signal from the object to each said spaced location, second circuit means for determining the distance between each said respective spaced location and the object in response to the determined time-of-flight, third circuit means for computing the angle of displacement of the object from said reference from the determinations of said second circuit means and providing a control signal indicative of the computed angle of displacement, and automatic tracking means for automatically tracking an object with the field of view of a camera in response to said control signal from said third circuit means.

16. The system of claim 15 wherein the object, said receiver means, and said two locations are in the same plane.

17. The system of claim 16 further comprising a receiving means at said reference position for receiving said signal transmitted at another location spaced a known distance from at least one of said two spaced locations, said other location and said one location and the object being in another plane, said first circuit means determining the distance between said other location and the object, said second circuit computing another angle of displacement of the object from said reference in said other plane and providing another output signal indicative thereof.

18. A system for controlling the field of view of a camera to automatically track an object including automatic tracking means for automatically tracking an object with the field of view of a camera, a first transmitter means located at the object for transmitting a signal, a pair of receiver means spaced a known distance apart for receiving said transmitted signal and providing respective receiver output signals, synchronizing means for providing a first sync signal to said transmitter means to initiate transmission of said signal and a second sync signal to each said receiver means to coordinate the transmission and receiving of said transmitted signal, each said receiver including circuit means responsive to said sync signals for determining the difference in time between the transmission of said transmitted signal and the receiving of said transmitted signal by respective said receiver means and providing a time-of-flight output signal indicative of said determined difference for tracking an object with the field of view of a camera in response to said time-of-flight output signal.

19. The system of claim 18 wherein the object and said receiver means and said two spaced locations are in the same plane.

* * * * *